_United States Patent Office_ 2,987,256
Patented June 6, 1961

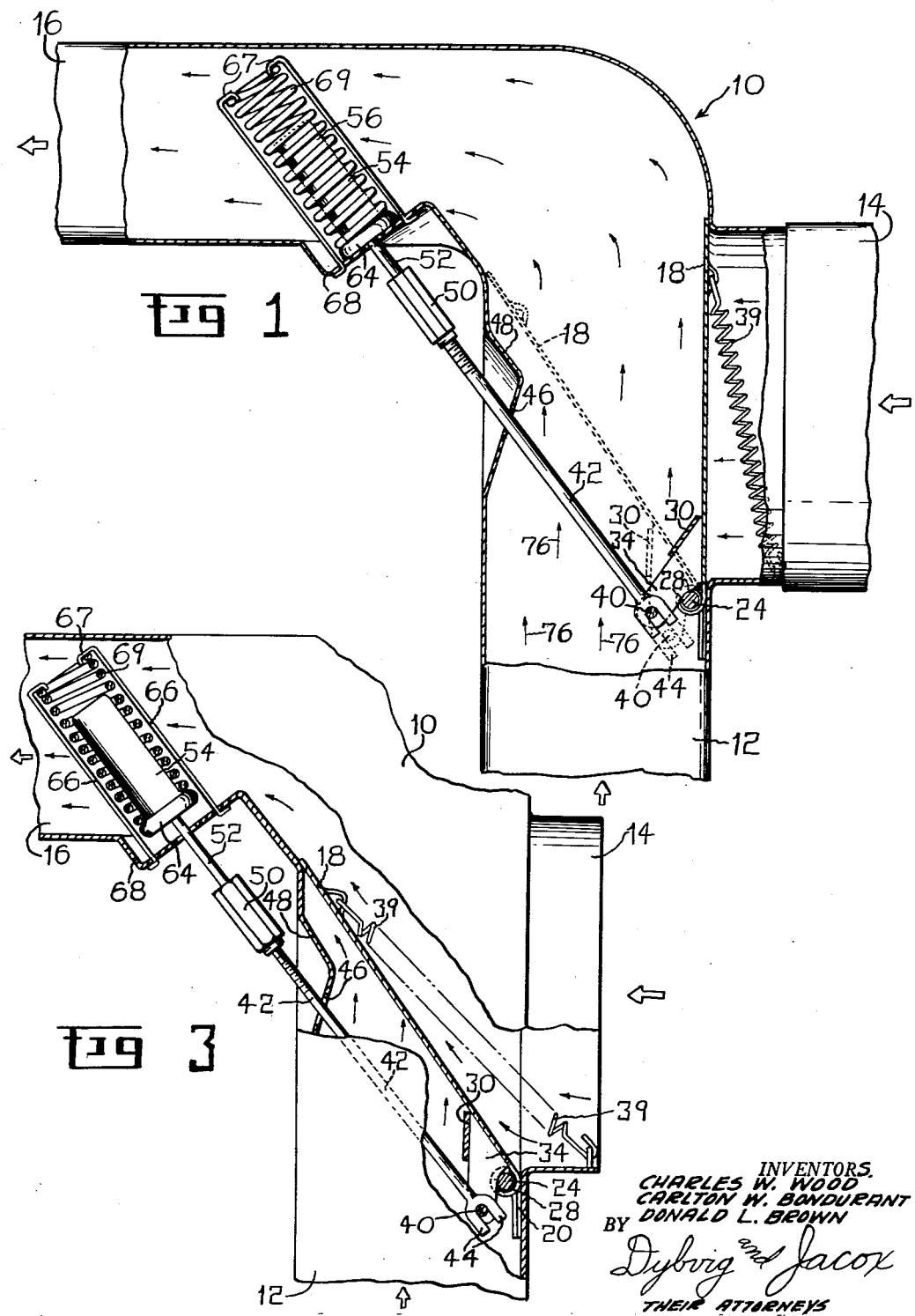

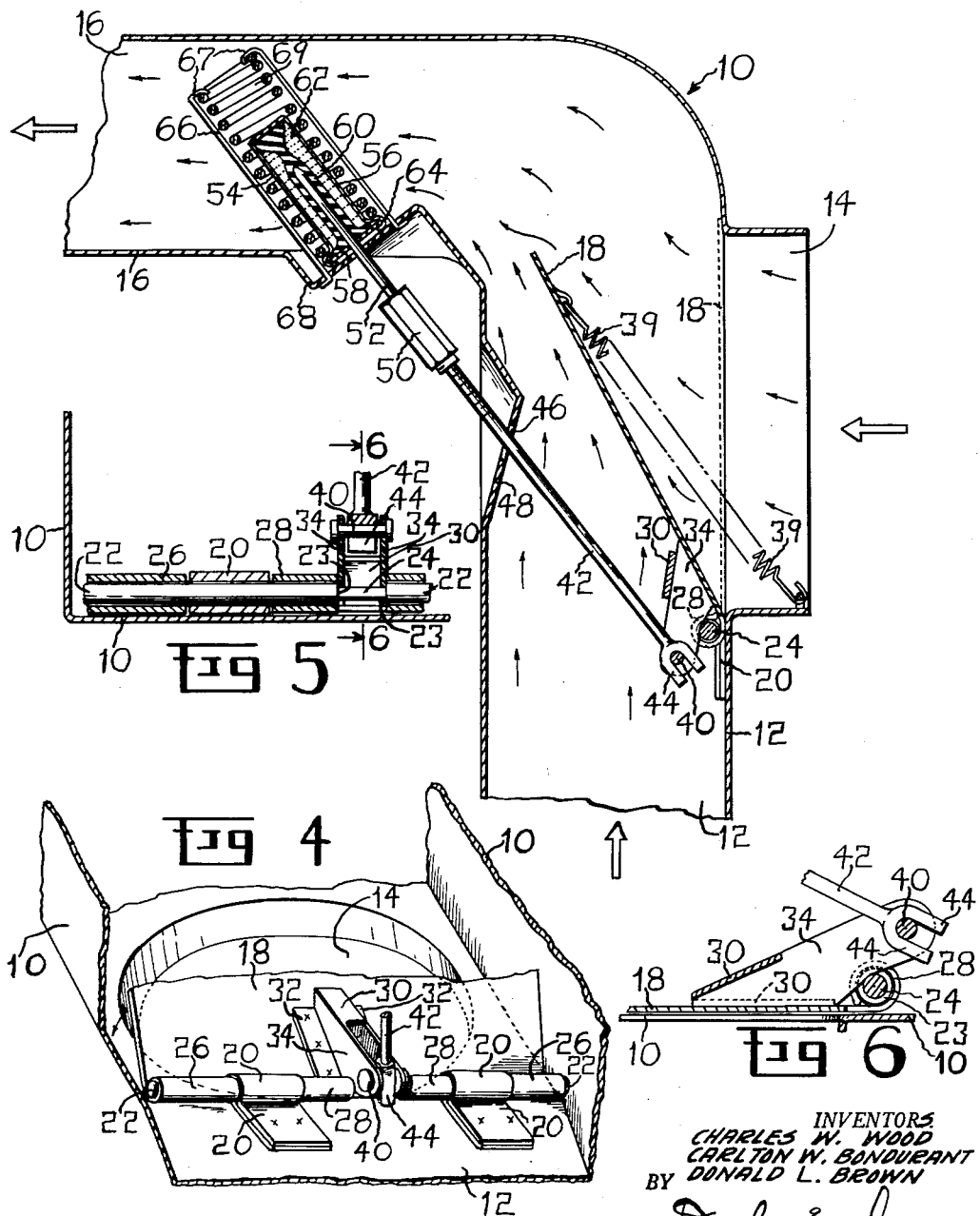

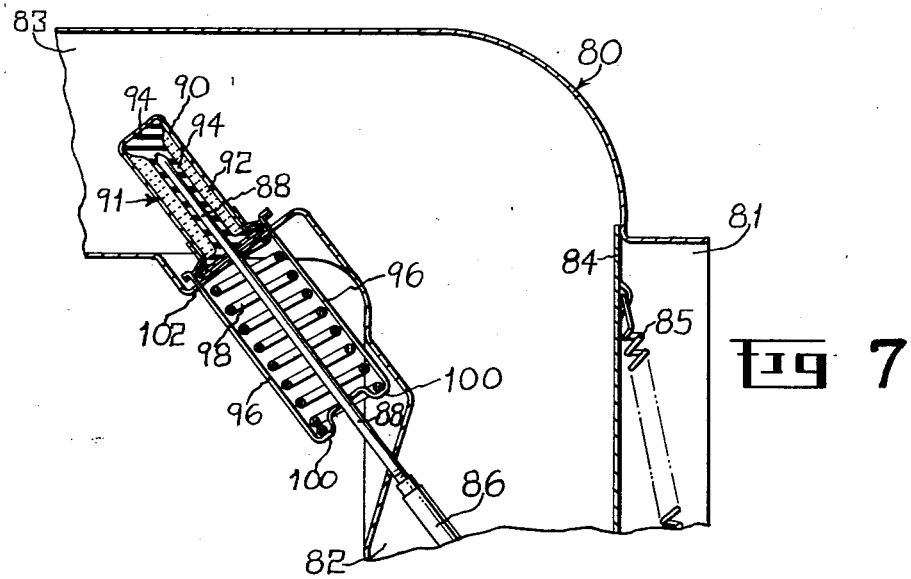
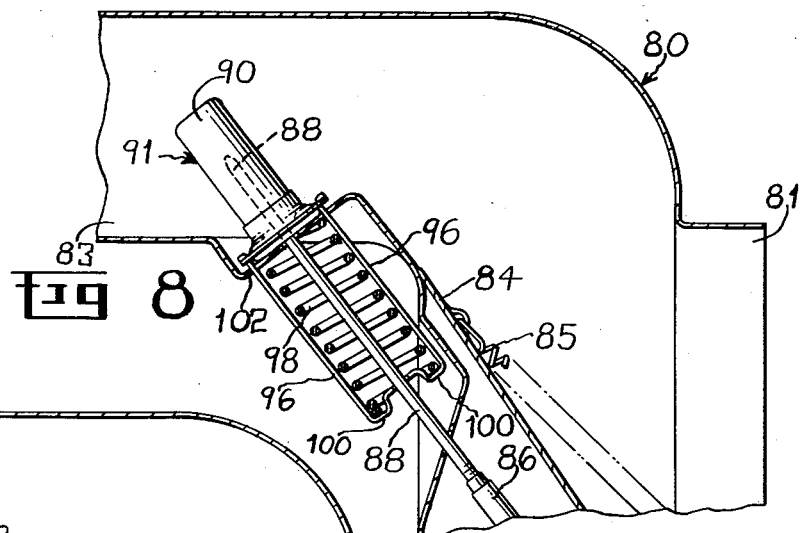
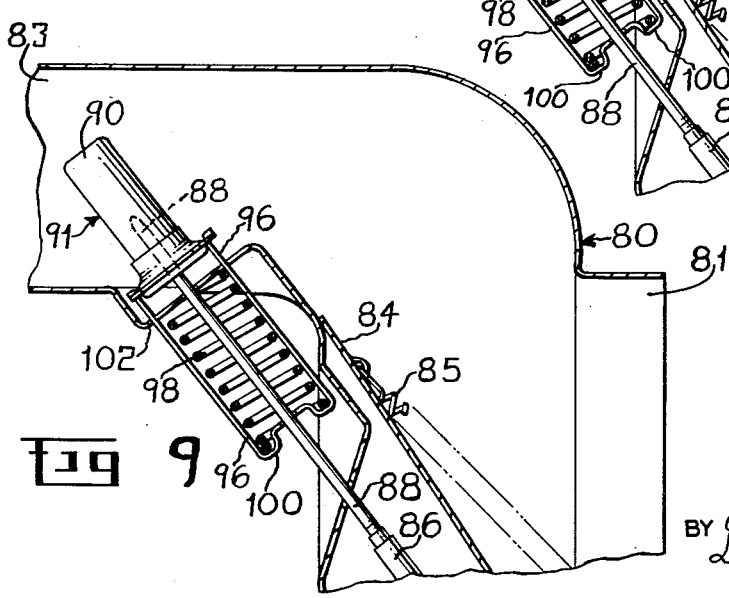

2,987,256
FLUID CONTROL ASSEMBLY
Charles W. Wood, Lebanon, Carlton W. Bondurant, Dayton, and Donald L. Brown, Vandalia, Ohio, assignors to Standard-Thomson Corporation, Vandalia, Ohio, a corporation of Delaware
Filed Sept. 7, 1956, Ser. No. 608,492
3 Claims. (Cl. 236—12)

This invention relates to a fluid control assembly. The invention relates more particularly to a thermally responsive fluid control assembly. The invention also relates to a fluid control assembly in which fluid from a plurality of sources may be mixed. However, the invention is not so limited in that the fluid control assembly of this invention is also applicable to control fluid from a single source rather than a plurality of sources and the invention may be used with types of actuator units other than thermal responsive motors.

An object of this invention is to provide a fluid control assembly particularly adapted for the control of fluids received from a pair of inlets in which the temperature of fluid received through one inlet is different from the temperature of fluid received through the other inlet.

Another object of this invention is to provide a fluid control assembly operable by thermal responsive means in which the elements of the assembly are provided with protective means so that the elements are not mechanically stressed by subjection to abnormal temperatures.

Another object of this invention is to provide a fluid control valve member having means for pivotal attachment thereof to a support structure so that the valve member is readily pivotal while being firmly maintained in proper alignment.

Other objects and advantages reside in the construction of parts, the combination thereof, the mode of operation, and the method of manufacture, as will become more apparent from the following description.

In the drawings:

FIGURE 1 is a side sectional view, with parts broken away, showing a fluid control assembly of this invention.

FIGURE 2 is a side sectional view similar to FIGURE 1. FIGURE 2 shows elements of the assembly in different positions from the positions shown in FIGURE 1.

FIGURE 3 is a side sectional view, with parts broken away, of a fluid control assembly of this invention showing elements thereof in different positions from the positions shown in FIGURES 1 and 2.

FIGURE 4 is a fragmentary enlarged perspective view of this invention showing means for pivotally attaching a valve closure member to a support structure.

FIGURE 5 is an enlarged fragmentary sectional view showing means for pivotally attaching a valve closure member to a support structure.

FIGURE 6 is an enlarged fragmentary sectional view taken substantially on line 6—6 of FIGURE 5.

FIGURE 7 is a side sectional view, with parts broken away, of a preferred modification of a fluid control assembly of this invention.

FIGURE 8 is a side sectional view, similar to FIGURE 7 but showing elements of the assembly in different positions.

FIGURE 9 is a side sectional view, with parts broken away, of the preferred modification of this invention with some of the elements in different operating positions from the positions shown in FIGURES 7 and 8.

Referring to the drawings in detail, a fluid control assembly of this invention comprises a housing or main conduit member 10 which may be right angular in shape as shown or may be of any other suitable shape. The conduit 10 is provided with an inlet passage 12 and an inlet passage 14. The conduit 10 also has an outlet passage 16 which is shown herein as being normal to the inlet passage 12.

Pivotally attached within the main conduit 10 is a valve or closure member 18. The valve or closure member 18 is attached to the internal wall of the main conduit 10 in the following manner. A pair of bearing members 20 are secured to the internal wall surface of the main conduit member 10 adjacent the inlet passage 14 in any suitable manner, such as by welding or the like. Rotatably supported by the bearing members 20 is a shaft 22 which extends through and beyond each of the bearing members 20, as best shown in FIGURES 4 and 5. The shaft 22 has a reduced portion 24 which is substantially equi-distant from the ends of the shaft member 22. The reduced portion 24 terminates in a shoulder member 23 at each end thereof.

The closure member 18 has a plurality of sleeve members 26 which are integral therewith at one edge portion thereof. The sleeve members 26 encircle the ends of the shaft 22 which extend beyond the bearing members 20. Also integrally attached to the closure member 18 and in axial alignment with the sleeve members 26 are a plurality of sleeve members 28 which encircle the shaft 22 between the bearing members 20 and which are disposed at either side of the reduced portion 24 of the shaft 22. Rigidly attached to the closure member 18 adjacent the sleeve members 28 is a bracket 30 which is secured to the closure member 18 by means of a pair of flanges 32. The bracket 30 has a bifurcated end portion 34 which engages the reduced portion 24 of the shaft 22 intermediate the shoulder members 23. Thus, the closure member 18 is pivotally supported within the conduit member 10 adjacent the inlet passages 12 and 14 for closure thereof. The closure member 18 is held firmly in aligned position with respect to the bearing members 20 and with respect to the inlet passages 12 and 14 by means of the bracket member 30. The shaft member 22 is thus held against axial movement by the bracket 30 while the sleeve members 26 and 28 rotatably encompass the shaft 22.

An elongate spring member 39 has one end thereof attached to the inlet passage 14 and the other end thereof attached to the closure member 18 adjacent the end thereof. The spring member 39 thus urges the closure member 18 toward the inlet passage 14 to normally close the inlet passage 14, as shown in FIGURE 1.

A pin member 40 is retained by the bifurcated end 34 of the bracket 30 and is parallel to the shaft 22.

A rod member 42 for actuation of the closure member 18 has a U-shaped end portion 44 which engages the pin member 40. The rod member 42 extends through an opening 46 of an indented portion 48 of the conduit 10. The rod member 42 is adjustably attached by means of a nut 50 to an actuator rod 52 of a thermal responsive actuator 54 which is positioned in the outlet passage 16. The thermal responsive actuator 54 may be of any suitable type but is herein shown as comprising a container 56 provided with an end wall 58 through which the actuator rod 52 extends, as shown in FIGURE 2. Within the container member 56 is an elastic body 60 which covers the portion of the actuator rod 52 which is disposed within the container 56. Surrounding the elastic body 60 is an expansible-contractible material 62 which when subjected to increased temperatures increases in volume so that the material 62 squeezes the elastic body 60 causing relative movement between the actuator rod 52 and the container 56. Securing the end wall 58 to the container 56 is a bent-over flange member 64.

A plurality of arm members 66 are parallel to the longitudinal axis of the container 56 and are arranged to encompass the container 56. One end of each of the arm members 66 is attached to an off-set portion 68 of the conduit 10. The other end of each of the arm members 66 is in the form of a spring seat 67. A helical spring 69 encircles the container 56 and is compressed between the spring seat 67 and the flange 64 of the container 56, urging the container 56 toward the off-set portion 68. Thus, the actuator member 54 may resiliently move with respect to the off-set portion 68.

Due to the fact that the closure member 18 is normally retained in position as shown in FIGURE 1, fluid may normally enter the conduit 10 through the inlet passage 12 as shown by arrows 76 in FIGURE 1.

The arrangement of elements of the invention as shown in the figures herein is such that the inlet passage 12 is adapted to connect to a source of warmer fluid while the inlet passage 14 is adapted to connect to a source of cooler fluid. Thus, as fluid enters the conduit 10 through the inlet passage 12 as shown by arrows 76 in FIGURE 1, the fluid comes in contact with the thermal responsive actuator 54 causing expansion of the expansible-contractible material 62 within the container 56. Upon expansion of the expansible-contractible material 62 the elastic body causes a squeezing action upon the portion of the actuator rod 52 within the container 56 so that the actuator rod 52 is forced to move in a direction from the contaner 56. Thus, the rod 42 having the end portion 44 in engagement with the pin 40 forces pivotal movement of the bracket member 30 as the bracket member 30 serves as a crank to cause movement of the closure member 18 in a direction from the inlet 14, as shown in FIGURE 2. Movement of the closure member 18 away from the inlet passage 14 is, of course, against the tensional forces exerted by the spring member 39.

Thus, the fluid reaching the actuator member 54 and flowing outwardly from the conduit 10 through the outlet passage 16 is a mixture of fluid entering the conduit 10 through the inlet passages 12 and 14.

If the temperature of the fluid coming into engagement with the container 54 increases, the closure member 18 is caused to move farther from the inlet passage 14 by the actuator 54, permitting a greater flow of fluid into the conduit 10 through the inlet passage 14 and causing a lesser flow of fluid through the inlet passage 12. If the temperature of the fluid passing through the outlet passage 16 and engaging the actuator 54 reaches a given value the actuator 54 causes the closure member 18 to move to its fullest extent until the inlet passage 12 is completely closed and the closure member 18 is in engagement with the internal wall of the conduit 10, adjacent the indented portion 48 of the conduit 10 as shown in dotted lines in FIGURE 1.

Thus, all of the fluid reaching the thermal responsive actuator 54 and flowing outwardly from the conduit 10 to the outlet passage 16 enters the conduit 10 through the inlet passage 14.

If the temperature of the fluid reaching the thermal responsive actuator 54 and coming entirely through the inlet passage 14 increases further in temperature, there is increased expansion of the expansible-contractible material within the container 56. However, due to the fact that the closure member 18 is in firm engagement with the walls of the conduit 10 and the inlet passage 12 is completely closed, the closure member 18 can move no farther from the inlet passage 14 than the position shown in dotted lines in FIGURE 1.

Therefore, upon increased expansion of the expansible-contractible material 62 within the container 56, the actuator rod 52 remains stationary while the container member 56 moves in a direction from the actuator rod 52 as the container member 56 causes increased compression of the spring 69 which encircles the container 56. Thus, the container member 56 moves away from the off-set portion 68 of the conduit 10, as shown in FIGURE 3.

Thus, it is understood that upon subjection of the thermal responsive actuator 54 to abnormal temperatures, there is no mechanical injury or damage to the elements of the fluid control assembly. This is due to the fact that the mechanical forces upon the closure member exerted by the actuator 54 increase only a small amount after the closure member has fully closed the inlet passage 12, even though the temperatures within the outlet passage increase.

FIGURES 7, 8 and 9 show a preferred modification of the fluid control assembly of this invention. In this preferred modification is shown a main housing or conduit member 80, which has inlet passageses 81 and 82 and an outlet passage 83. The housing 80 is provided with a valve or closure member 84 which is hingedly attached thereto intermediate the inlet passages 81 and 82 in a manner as described with respect to FIGURES 1, 2, 3, 4, 5, and 6 of the preferred embodiment.

The valve member or closure member 84 has a spring member 85 attached thereto which is similar to the spring member 39 of the preferred embodiment and which serves a similar purpose.

A connector rod member 86 has one end thereof attached to the closure member 84 in a manner which may be similar to that shown with regard to the rod 42 shown in FIGURES 1, 2, 3, 4, 5 and 6. The connection of the rod member 86 to the closure member 84 may also be by any other suitable means. The connector rod member 86 is rigidly attached to an actuator rod 88 which is in alignment therewith. The actuator rod 88 extends into a container member 90, of an actuator 91 which is disposed within the outlet passage 83.

Within the container 90 is a body of thermal responsive expansible-contractible material 92 which may be similar to the expansible-contractible material 62 within the container 56 shown in FIGURE 2. Within the container 90 and within the expansible-contractible material 92 is an elastic body 94 within which the actuator rod 88 extends.

The container 90 is attached to a plurality of elongate spring retainer members 96 which extend parallel to the actuator rod 88. Encompassing the actuator rod 88 and substantially concentric therewith is an elongate helical spring member 98 which is compressed between end portions 100 of the spring retainers 96 and an offset portion 102 of the conduit 80.

Therefore, as the temperature of the fluid which comes in contact with the container member 90 increases, the expansible-contractible material 92 within the container 90 forces the actuator rod 88 outwardly from the container 90. This outward movement of the actuator rod 88 causes pivotal movement of the closure member 84 until the closure member 84 engages the internal wall surface of the housing 80, adjacent the spring 98, as shown in FIGURE 8. Thus, all fluid reaching the actuator 91 enters through the inlet passage 81.

Upon further increase in temperature of fluid contacting the actuator 91, pressures within the container member 90 cause the container member 90 to move with respect to the actuator rod 88. Thus, the container member 90 carries with it the spring retainer members 96 so that the end 100 of the spring retainer members 96 moves closer to the offset portion 102 of the conduit 80, as shown in FIGURE 9. Thus, the helical spring member 98 is further compressed. However, stresses upon the closure member 84 or any of the other elements of the assembly increase only slightly as the temperature within the outlet passage of the conduit increases.

Although the preferred embodiment of the device has been described, it will be understood that within the purview of this invention various changes may be made in the form, details, proportion and arrangement of parts, the combination thereof and mode of operation, which

Having thus described our invention, we claim:

1. A fluid mixing valve comprising a housing member having a pair of inlet conduits substantially normal one to the other, the inlet conduits being in adjacent relation, a closure member pivotally attached within the housing intermediate the inlet conduits and movable to close either inlet conduit, the housing also having an outlet conduit substantially normal to one of the inlet conduits, the outlet conduit having an angularly disposed offset portion, the inlet conduit which is normal to the outlet conduit having an angular offset portion which faces the angular offset portion of the outlet conduit, a thermal responsive actuator within the outlet conduit, a spring retainer member attached to the actuator and slidably and reciprocally movable through the offset portion of the outlet conduit, an elongate helical spring member exterior of the outlet conduit and compressed between the spring retainer and the offset portion of the outlet conduit, each of the offset portions of the said conduits having an aperture therein, the apertures being aligned one with the other, a rod member movable by the actuator and extending through the apertures, the rod member being attached to the closure member for movement thereof.

2. A fluid control assembly comprising a fluid conduit, the fluid conduit having a pair of inlet passages substantially normal one to the other, a closure member hingedly attached to the conduit and movable to close either of the inlet passages, the conduit also having an outlet passage angularly disposed with respect to the inlet passages, a thermal responsive actuator member disposed within the outlet passage, a plurality of elongate spring retainer members attached to the actuator and slidably extending through the conduit, a helical spring compressed between the retainer members and the conduit member, and an actuator rod movable by the actuator and connected to the closure member for movement thereof upon changes in temperature within the outlet passage.

3. A fluid control assembly of the type provided with a fluid conduit having an inlet passage, a closure member movable to close the inlet passage, the conduit also having an outlet passage, an actuator member movably disposed within the outlet passage, the combination comprising an actuator rod reciprocally movable by the actuator member and attached to the closure member for movement thereof, a spring retainer slidably extending through the conduit adjacent the actuator member, a spring member engaging the spring retainer and compressed intermediate the spring retainer and the conduit so that the actuator member is resiliently movable against the resiliency of the spring member, the actuator rod being urged by the actuator member in a direction from the actuator member to cause the closure member to engage the conduit closing the inlet passage, further urging of the actuator rod in a direction from the actuator member causing movement of the actuator member against the force of the spring member.

References Cited in the file of this patent

UNITED STATES PATENTS

| | | |
|---|---|---|
| 752,998 | Osbourn | Feb. 23, 1904 |
| 1,000,435 | Pagelsen | Aug. 15, 1911 |
| 1,017,572 | Lund | Feb. 13, 1912 |
| 1,607,745 | Palm | Nov. 23, 1926 |
| 1,797,113 | Whatmough et al. | Mar. 17, 1931 |
| 2,063,436 | Hild | Dec. 8, 1936 |
| 2,139,505 | Kirgan | Dec. 6, 1938 |
| 2,213,997 | Schweizer | Sept. 10, 1940 |
| 2,351,086 | Wells | June 13, 1944 |
| 2,489,896 | Kempton | Nov. 29, 1949 |
| 2,539,280 | Smith | Jan. 23, 1951 |
| 2,560,293 | Kempton | July 10, 1951 |
| 2,624,512 | Rickenback | Jan. 6, 1953 |
| 2,765,984 | Puster | Oct. 9, 1956 |
| 2,781,979 | Kraft | Feb. 19, 1957 |